Aug. 29, 1939.  E. CANEPA  2,171,138
AUTOMATIC LOCKING DEVICE
Filed March 4, 1938  2 Sheets-Sheet 1
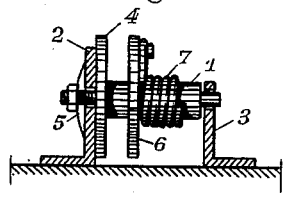
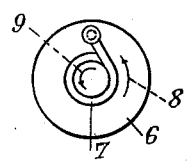
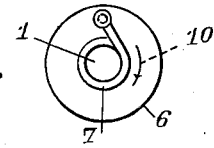
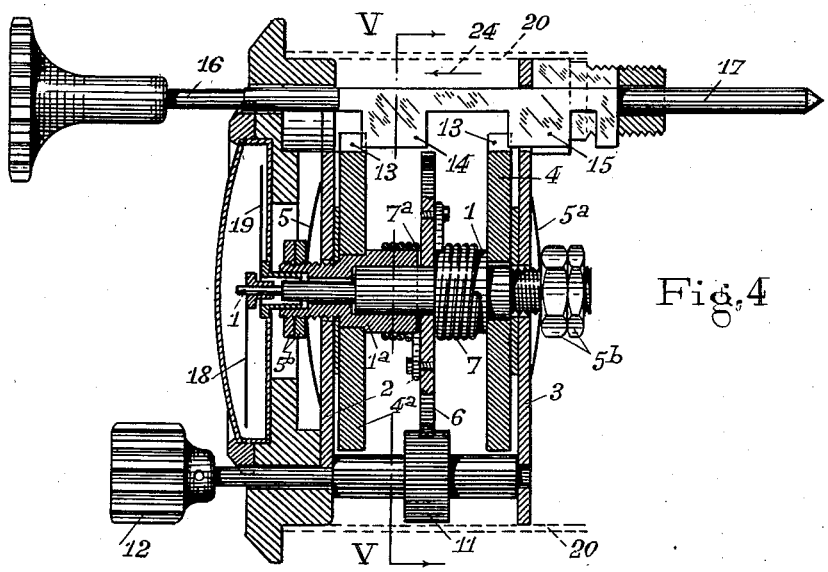
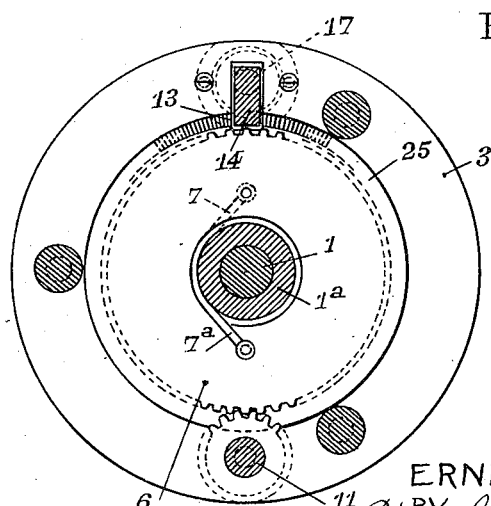
INVENTOR:
ERNEST CANEPA
BY
Haseltine Lake & Co.
ATTORNEYS Aug. 29, 1939.                E. CANEPA                 2,171,138
                         AUTOMATIC LOCKING DEVICE
                      Filed March 4, 1938      2 Sheets-Sheet 2
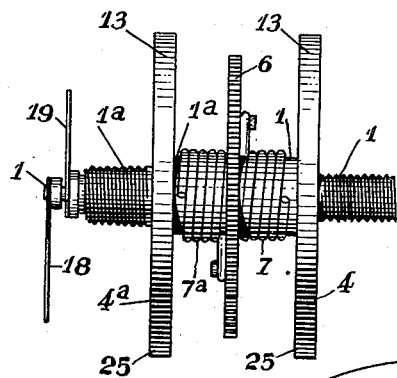
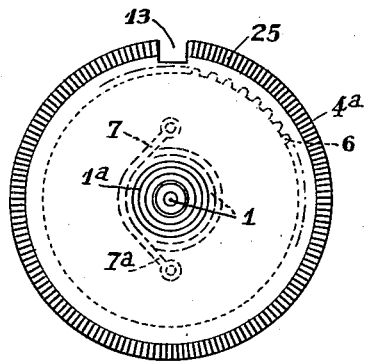
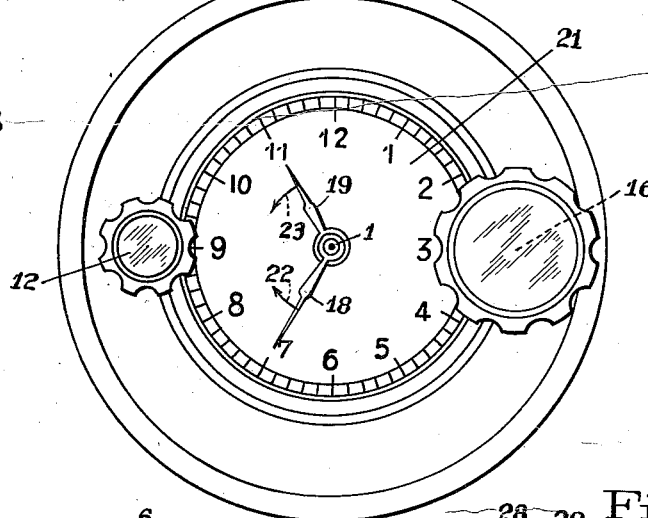
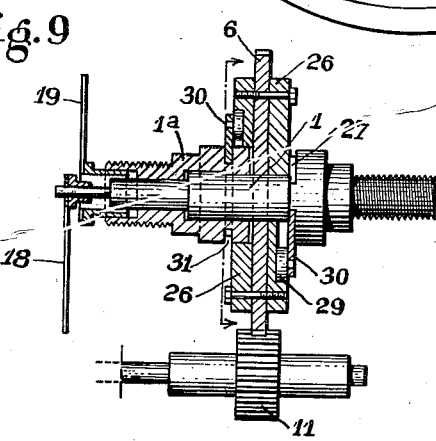
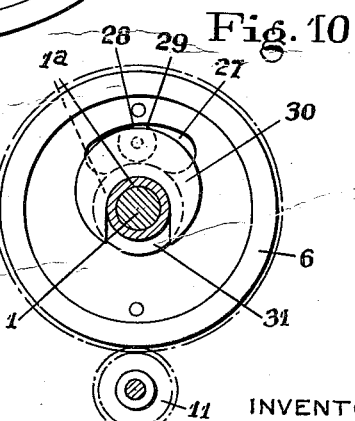
INVENTOR:
ERNEST CANEPA
BY
Haseltine, Lake & Co.
ATTORNEYS Patented Aug. 29, 1939

2,171,138

UNITED STATES PATENT OFFICE 2,171,138

AUTOMATIC LOCKING DEVICE

Ernest Canepa, Gemenos, Bouches-du-Rhone, France

Application March 4, 1938, Serial No. 193,832
In France August 19, 1937

5 Claims. (Cl. 70—306)

The object of the present invention consists in improvements made in the apparatus for protection from theft for all keyless locks, which is controlled by clock hands, described in French Patent No. 795,085 taken out on September 18, 1935.

Said improvements have for their purpose to simplify considerably the construction of the apparatus while retaining its principle. They are characterized by the utilization of the variable tension of "coil" springs for causing the displacement of the controlling member in one direction only. Said springs act in combination with flexible braking washers of known type and operation which are included in the protecting apparatus.

Said improvements are shown in the accompanying drawings which are given by way of example of one of the embodiments of the object of the present invention.

In said drawings:

Figs. 1, 2 and 3 are essentially diagrammatical illustrations of the principle of actuation and of braking which characterizes the improvements made in the construction of the apparatus;

Fig. 4 shows, on a slightly enlarged scale, seen from the side and in longitudinal section, an assembly of the parts forming the improved apparatus;

Fig. 5 shows, seen from the front and in transverse section along the line V—V of Fig. 4, one of the discs with a notch allowing the tenons or bits of the stop member to pass;

Fig. 6 shows an outside side view of the device for actuating the discs which carry the opening notches;

Fig. 7 is a front view of Fig. 6;

Fig. 8 is an outside front view of the apparatus, on the side of the dial carrying the clock hands.

Fig. 9 shows in longitudinal section a modification of construction in the device for actuating the shafts carrying the hands.

Fig. 10 is a front view in part section of the device shown in Fig. 9.

The principle of driving and of braking which is used in the improved protecting apparatus is shown in the diagrammatical Figures 1, 2 and 3. It consists of a shaft 1, or any similar cylindrical body rotating in bearings 2 and 3.

On said shaft is provided a friction disc 4 which bears against one of the faces of the bearing 2 by means of the adjustable tension of a resilient washer 5 of known type and operation. On said shaft 1, there loosely rotates a second disc 6 on which is fixed one of the ends of a spring 7, known as a coil spring, the convolutions of which are sufficiently tight around the shaft 1 to prevent said spring from rotating freely on the latter.

If the disc 6, Fig. 2, is now rotated in the direction of the arrow 8, the tension of the convolutions of the spring 7 will be greater owing to the tightening of the latter on the shaft 1; said tension will at a given instant overcome the resistance exerted by the resilient washer 5 on the friction disc 4 and the shaft 1 will rotate in the direction of the arrow 9. If, on the contrary, the disc 6, Fig. 3, is driven in the direction of the arrow 10, the tension of the convolutions of the spring 7 will decrease on the shaft 1, and the latter will not be driven because the tension of the washer 5 will be preponderant on the friction disc 4.

It is essentially this same principle of construction and its operation that is again found in the apparatus shown in Fig. 4 and the following.

On the shaft 1 is mounted a gear 6 connected to the springs 7 and 7a, one of which drives the disc 4 and the other the disc 4a, this latter being mounted on a sleeve 1a which rotates loosely on the shaft 1. Resilient washers 5 and 5a are arranged on the outer faces of the bearings 2 and 3 which in this case form the sides of the case of the apparatus; the variable tension of the resiliency of the washers is obtained more advantageously by means of maiden nuts and lock-nuts 5b.

The gear 6 constantly meshes with a pinion 11 which is actuated from the outside by means of a knob 12.

The discs 4 and 4a each have a notch 13 through which passes each of the bits 14 and 15 carried by the push rod 16; on the end 17 of said rod is fixed the member to be actuated; gasoline supply cock, electric contact, etc., which owing to their position make it impossible to start the vehicle or to actuate the protecting apparatus.

On the end of the shaft 1 is fixed the large hand 18 of a clock, and inside the sleeve 1a is fixed a small hand 19.

A case 20, shown in dotted lines in Fig. 4, encloses all these parts forming the apparatus, the operation of which is as follows:

By actuating the pinion 11 by means of the knob 12, in a direction of rotation from right to left, the gear 6 rotates and, through the instrumentality of the spring 7, the shaft 1 rotates and displaces the large hand 18 in front of the dial 21 in the direction of the arrow 22, Fig. 8. By actuating the same knob 12 but in the opposite direction, that is to say from left to right, the gear 6, through the instrumentality of the spring 7ᵃ, drives the sleeve 1ᵃ carrying the small hand 19 which rotates in front of the dial 21 in the direction of the arrow 23, Fig. 8.

In the example shown, in order to obtain the free displacement of the key 16 it is necessary to place the small hand 19 on 11 o'clock and the large hand 18 on the 35th minute. At this instant notches 13 provided on the discs 4 and 4ᵃ are opposite each other owing to the connection of said discs with the hands.

The registering of the notches 13 then enables the bits 14 and 15 of the push rod 16 to pass freely through the notches 13 and to actuate the members which determine the starting of the vehicle.

On arriving at a fresh stopping place it suffices to pull out the push rod 16 in the direction of the arrow 24 and to actuate the knob 12 in either direction, which will have the effect of displacing the discs 4 and 4ᵃ and of making the notches 13 no longer register.

In order to prevent any possibility of actuating the discs 4 and 4ᵃ by pushing or by pulling the push rod 16 for the purpose of causing the apparatus to operate without knowing the secret of same, serrations 25, Figs. 5, 6 and 7, are provided on the faces of said discs which will be engaged by corresponding serrations on the edge of the bits 14 and 15 carried by the rod 16, thereby forming a kind of keying between these parts which makes any rotation of the discs 4 and 4ᵃ impossible.

However the same actuation effect of the shaft 1 and the sleeve 1ᵃ can be produced by utilizing the known principle of a roller, Figs. 9 and 10, moving with a circular movement on a raceway having an inclined plane; this is the principle of the free wheels of bicycles and also the one used in certain cameras.

In the application of this principle to the apparatus which is the object of the invention, there are fixed on each side of the gear 6, discs 26 each of which has formed on its outer face a chamber 27, Fig. 10, the upper wall 28 of which is arranged to form an inclined plane for the roller 29 which is carried by a crescent-shaped part 30. Said part is more advantageously held in contact with the shaft 1 or the sleeve 1ᵃ by means of a groove 31 provided for this purpose in the shaft 1 and the sleeve 1ᵃ.

The known operation of this device is merely summarized herein: it suffices to drive the gear 6 and the discs 26 in either direction by means of the pinion 11 in order to cause immediately one of the rollers 29 to come into contact with the inclined surface 28 of the chambers 27 provided in each of the discs 26, thereby causing the part 30 to grip the shaft 1 or the sleeve 1ᵃ and drive same.

Thus by the use of said improvements, a very great simplification of mechanical members and movements is effected, which, while giving the same guarantees as the apparatus described in French Patent No. 795,085 of September 18, 1935, reduces the manufacturing cost thereof and thus permits a wider diffusion of said apparatus preventing more particularly the theft which is so frequent of automobiles and the consequences of same.

I claim:
1. A device for locking a movable member comprising a clock dial, a shaft rotatably mounted substantially at right angles to said dial and projecting therethrough, a gear loosely mounted upon said shaft, a sleeve loosely mounted upon said shaft and projecting through said dial, hands secured to the ends of said shaft and sleeve, means for manually rotating said gear, means releasably connecting said gear with said shaft and with said sleeve, whereby said gear may alternately rotate said shaft and said sleeve, and means associated with said shaft and said sleeve for locking said movable member in a predetermined position.

2. A device for locking a movable member comprising a clock dial, a shaft rotatably mounted substantially at right angles to said dial and projecting therethrough, a gear loosely mounted upon said shaft, a sleeve loosely mounted upon said shaft and projecting through said dial, hands secured to the ends of said shaft and sleeve, means for manually rotating said gear, coil spring means releasably connecting said gear with said shaft and with said sleeve whereby said gear may alternately rotate said shaft and said sleeve, and means associated with said shaft and said sleeve for locking said movable member in a predetermined position.

3. In a device of the character described, the combination of a shaft, a gear, a sleeve and coil springs, said gear being loosely mounted upon said shaft and said sleeve being loosely mounted upon said shaft, one of said coil springs being connected to said gear and being coiled around said shaft, another coil spring being connected to said gear and being coiled around said sleeve, whereby movement of said gear causes one of said springs to grip said sleeve or said shaft and rotate same.

4. A device for locking a movable member comprising a clock dial, a shaft rotatably mounted substantially at right angles to said dial and projecting therethrough, a gear loosely mounted upon said shaft, a sleeve loosely mounted upon said shaft and projecting through said dial, hands secured to the ends of said shaft and sleeve, means for manually rotating said gear, means releasably connecting said gear with said shaft and with said sleeve whereby said gear may alternately rotate said shaft and said sleeve and discs secured to said shaft and said sleeve, said discs having notches through which a portion of said movable member is adapted to pass.

5. A device for locking a movable member comprising a clock dial, a shaft rotatably mounted substantially at right angles to said dial and projecting therethrough, a gear loosely mounted upon said shaft, a sleeve loosely mounted upon said shaft and projecting through said dial, hands secured to the ends of said shaft and sleeve, means for manually rotating said gear, means releasably connecting said gear with said shaft and with said sleeve whereby said gear may alternately rotate said shaft and said sleeve and discs secured to said shaft and said sleeve, said discs having notches through which a portion of said movable member is adapted to pass, one of said discs and a portion of said movable member having mating projections and depressions.

ERNEST CANEPA.